(12) United States Patent
Muller et al.

(10) Patent No.: US 7,489,820 B1
(45) Date of Patent: Feb. 10, 2009

(54) SYSTEM FOR MEASURING THE SURFACE GEOMETRY AND SURFACE EVENNESS OF FLAT PRODUCTS

(75) Inventors: Ulrich Muller, Monheim (DE); Detlef Winter, Vordorf (DE); Detlef Sonnenschein, Essen (DE); Rudolf Stockmeyer, Langenfeld (DE); Gustav Peuker, Mönchenglad (DE)

(73) Assignee: VDEh-Betriebsforschungsinstitut GmbH, Dusseldorf (DE)

( * ) Notice: Subject to any disclaimer, the term of this patent is extended or adjusted under 35 U.S.C. 154(b) by 0 days.

(21) Appl. No.: 09/787,172

(22) PCT Filed: Sep. 7, 1999

(86) PCT No.: PCT/EP99/06594

§ 371 (c)(1),
(2), (4) Date: Jun. 12, 2001

(87) PCT Pub. No.: WO00/16040

PCT Pub. Date: Mar. 23, 2000

(30) Foreign Application Priority Data

Sep. 14, 1998 (DE) .................. 198 42 138

(51) Int. Cl.
*G06K 9/48* (2006.01)
(52) U.S. Cl. .................. 382/199; 72/9.1; 72/11.7; 72/37; 250/559.19; 356/432; 356/604; 382/141

(58) Field of Classification Search .............. 250/458.1, 250/559.01, 559.08, 559.11, 559.13, 559.22, 250/559.07, 559.45, 237 G, 559.19; 356/239.1, 356/414, 416, 419, 601–604, 607, 432, 429, 356/445, 605; 348/221.1, 222.1, 229.1, 272, 348/276, 345, 347, 673; 382/108, 141, 144–145, 382/147, 151, 209, 211, 213, 274, 286, 199; 72/9.1, 11.7, 37
See application file for complete search history.

(56) References Cited

U.S. PATENT DOCUMENTS

| | | | | |
|---|---|---|---|---|
| 4,623,258 A | * | 11/1986 | Task et al. ................. 356/432 |
| 4,668,094 A | | 5/1987 | Matsumoto et al. |
| 4,897,719 A | * | 1/1990 | Griffin ................. 375/240.12 |
| H999 H | * | 12/1991 | Merkel et al. ............ 356/239.1 |
| 5,311,286 A | * | 5/1994 | Pike ........................ 356/605 |
| 5,332,905 A | * | 7/1994 | Brooker et al. ........... 250/458.1 |

(Continued)

FOREIGN PATENT DOCUMENTS

WO  PCT/EP99/06594  4/2001

*Primary Examiner*—Gregory M Desire
(74) *Attorney, Agent, or Firm*—Cook Alex Ltd.

(57) ABSTRACT

The invention relates to a device for producing a pattern on a surface for measuring, using a projector and a slide. The invention also relates to various advantageous embodiments of the measuring system.

11 Claims, 6 Drawing Sheets

U.S. PATENT DOCUMENTS

| | | | | |
|---|---|---|---|---|
| 5,463,464 A | * | 10/1995 | Ladewski | 356/601 |
| 5,488,478 A | | 1/1996 | Bullock et al. | |
| 5,592,246 A | | 1/1997 | Kuhn et al. | |
| 5,612,786 A | * | 3/1997 | Huber et al. | 356/604 |
| 5,646,733 A | * | 7/1997 | Bieman | 356/604 |
| 5,651,076 A | * | 7/1997 | Blanc et al. | 382/141 |
| 5,724,447 A | * | 3/1998 | Fukushima | 382/211 |
| 5,822,070 A | * | 10/1998 | Syre | 356/419 |
| 5,852,672 A | * | 12/1998 | Lu | 382/154 |
| 5,892,543 A | * | 4/1999 | Zheng et al. | 348/347 |
| 5,943,094 A | * | 8/1999 | Sakai et al. | 348/243 |
| 6,011,585 A | * | 1/2000 | Anderson | 348/272 |
| 6,028,672 A | * | 2/2000 | Geng | 356/602 |
| 6,055,056 A | * | 4/2000 | Kuehmstedt et al. | 356/601 |
| 6,061,091 A | * | 5/2000 | Van de Poel et al. | 348/241 |
| 6,081,614 A | * | 6/2000 | Yamada et al. | 382/151 |
| 6,101,267 A | * | 8/2000 | Shiraishi | 382/151 |
| 6,137,541 A | * | 10/2000 | Murayama | 348/673 |
| 6,175,645 B1 | * | 1/2001 | Elyasaf et al. | 382/147 |
| 6,285,787 B1 | * | 9/2001 | Kawachi et al. | 382/209 |
| 6,286,349 B1 | * | 9/2001 | Muller et al. | 72/11.7 |
| 6,366,367 B1 | * | 4/2002 | Schreier et al. | 358/487 |
| 6,438,272 B1 | * | 8/2002 | Huang et al. | 382/286 |
| 6,512,540 B2 | * | 1/2003 | Lathrop | 348/222.1 |
| 6,577,756 B1 | * | 6/2003 | Furui | 382/141 |
| 6,613,041 B1 | * | 9/2003 | Schrunder | 606/5 |
| 6,658,144 B1 | * | 12/2003 | Hatab | 382/144 |
| 6,668,075 B1 | * | 12/2003 | Nakamura et al. | 382/144 |
| 6,671,398 B2 | * | 12/2003 | Reinhorn et al. | 382/145 |
| 6,678,057 B2 | * | 1/2004 | Harding et al. | 356/603 |
| 6,874,724 B2 | * | 4/2005 | Muller et al. | 242/534.1 |
| 7,054,013 B2 | * | 5/2006 | Schyns et al. | 356/602 |
| 7,317,542 B2 | * | 1/2008 | Krambeer et al. | 356/603 |
| 7,407,101 B2 | * | 8/2008 | Han et al. | 235/457 |
| 2001/0012388 A1 | * | 8/2001 | Muller et al. | 382/141 |
| 2005/0089210 A1 | * | 4/2005 | Muller et al. | 382/141 |

* cited by examiner

SYSTEM FOR MEASURING THE SURFACE GEOMETRY AND SURFACE EVENNESS OF FLAT PRODUCTS

BACKGROUND OF THE INVENTION

The invention relates to a system for measuring the surface geometry of flat products, in particular of metal strip or bulk material, and also the surface evenness derived from the geometry.

Various methods are known for measuring the surface geometry of flat products. In addition to contact measurement, which is widely used and in which a plurality of contact measuring elements cover the surface to be measured, contactless measurement is advantageous particularly in the metal-strip field.

For this purpose, it is known to produce optical measurement points on the strip surface, to detect the location change thereof using suitable sensors and to convert it with the aid of a triangulation method into location changes on the strip surface. In this case, the change in the spatial coordinates of the surface point results from the angle of incidence of the light beam and the position of the sensor in conjunction with the location change of the imaging point.

A plurality of light spots can be used to make statements about a relatively large region of the flat product. However, methods which work with measurement lines are better suited to measuring areas. Thus, by way of example, the Moiré effect is utilized in order to image an interference pattern on the surface of the flat product and to quantitatively determine the surface geometry from this.

The German published Patent Application 197 09 992 discloses a method for measuring the surface geometry of a metal strip, in which, using a light source, a multiplicity of lines are produced by projection for example with the aid of a line transparency on the strip surface.

For this purpose, a projector aligned with the strip surface to be measured is arranged above the strip. A transparency is provided between the projector and the strip surface to be measured, a stripe pattern being imagined on the strip surface through the said transparency. Strip unevennesses bring about a change in the lines projected onto the strip surface. A measuring apparatus, for example a CCD camera, arranged behind the projector in the running direction of the strip, can be used to detect the changes in the measurement lines on the strip surface.

In order to calibrate the system, the line pattern is projected onto a reference plane. A "calibration table" is used for this purpose. The images—acquired by the camera—of the reference plane and of the strip to be measured are evaluated and compared according to the "phase-shifting method". With this method, a phase image is generated from the camera image. Each pixel of the camera supplies a specific brightness value. A periodic brightness profile is present in the transverse direction with respect to the line pattern. With the aid of the phase-shifting method, a phase angle is assigned to each pixel. The phases obtained with the aid of the calibration table serve as a reference phase image. With the aid of the phase image obtained on the object to be measured and the reference phase image, it is possible to determine the actual peak differences on the object to be measured.

High-quality measurement results can already be obtained using this measuring system, but the system is limited in particular in terms of its variability and is capable of improvement with regard to the measurement sensitivity.

SUMMARY OF THE INVENTION

The invention is based on the object of providing a surface measuring system which is suitable for different types of flat products and yields high-quality measurement results. Furthermore, the invention is based on the object of developing the measuring method described in the German published Patent Application 197 09 992 with regard to its possible fields of use and its resolution.

The problem of the invention is solved by the independent claims. Advantageous refinements are represented in the subclaims.

All independent aspects of the invention are utilized in the preferred overall system. According to one aspect of the overall system, camera and projector can span with the measurement points an angle which is less than 90°, and/or be arranged on one side of the flat body at different heights. This results in a space-saving embodiment which considerably extends the local field of use of the measuring system, since in many applications there is insufficient space available above the flat body.

According to a further aspect of the invention, a transparency is arranged between projector and flat body and allows the electronic generation of a line pattern, for example via a transparent liquid-crystal element. The optimal projection patterns for the individual case can thus be set by means of appropriate control or the computer system of the measuring system. This allows, for example, a combination of the line density, brightness and other properties of the projected pattern which is adapted to the requirements. Thus, the situation where a separate transparency has to be used for each individual case of measurement and, in particular, thusly a transparency having the desired combination of projection properties has to be produced is avoided. This reduces the costs and time taken for the individual applications. The system according to the invention is thereby significantly more flexible for different fields of use, in particular different surfaces.

Furthermore, this preferred embodiment of the measuring system according to the invention has, according to a further aspect of the invention, a regulated control of the camera and illumination parameters. Aperture, exposure time and brightness of the projector are automatically regulated in such a way that all the pixels of the measurement region have the desired control. This is particularly advantageous in the use of the measuring system according to the invention with cold strip. In this case, the properties can change continuously during measurement, for example due to reflection at the strip surface, and thus corrupt the measurement signals.

The performance of the measuring system is increased by another aspect of the invention by the measuring camera having a non-linear sensitivity. This is advantageous in particular when the changing reflection properties of a cold strip, for example, can no longer be compensated via the control with time and aperture adaptation. The non-linear sensitivity covers a considerable brightness spectrum, in a similar manner to the human eye, so that all measurement situations can be accurately detected.

For further improvement of the quality of the measurement results, the signals can be filtered. In particular during the measurement of metal strip in the rolling train, the measured values can be undesirably changed due to a displacement of the strip in the direction of the normal vector to the reference plane or in other directions and by bending of the strip. The displacement of the strip in the direction of the normal vector is already largely compensated by the use of a projected line pattern. The displacement in other directions or bending of the strip can be differentiated by filtering the surface changes as a result of strip unevenness, since the wavelengths of the respective movement components differ. Furthermore, this strip movement produces "developable areas", while the surface evenness is based on the non-developable component. On this basis, the filtering described can be used to represent a measurement signal which exclusively contains a statement about the strip unevenness. The values determined are preferably used to generate a suitable virtual compensation area with which undesirable displacement and bending can be compensated computationally.

In the preferred system, the measuring system is calibrated without the customary physical reference plane at the measurement point, by using arbitrary fixing points of the installation in order to generate a computational reference plane. This reference plane can be used to set the system both with regard to the peak differences and with regard to the longitudinal calibration. This avoids the use of the unwieldy and heavy physical reference plane, reduces the required space for measurement and avoids difficulties in bringing the reference plane into the position required for calibration. Furthermore corruption of the measurement signal as a result of unevennesses of the reference plane, which generally lie between +0.5 and −0.5 mm, is avoided.

From the camera image it is possible to determine not only the peaks of the strip surface of the running strip but also, in the case of non-continuous strips, such as e.g. hot strip or heavy plate, the peaks at the start and end of the strip, in particular the "ski", i.e. upward or downward bending.

In addition to the peaks, the border can be determined from the image data. The said border comprises the strip width, the strip sabre and the generally curvilinear boundaries of the start of the strip and end of the strip. The method described thus also detects e.g. curvilinearly bounded ends, so that it is also possible for the rolling installation to be corrected for the subsequent strip with the aid of this measuring method.

The measuring method can furthermore be used for determining the optimal cut length.

The invention is explained in more detail below using an exemplary embodiment illustrated in the drawing.

DETAILED DESCRIPTION OF THE INVENTION

Figure 1:
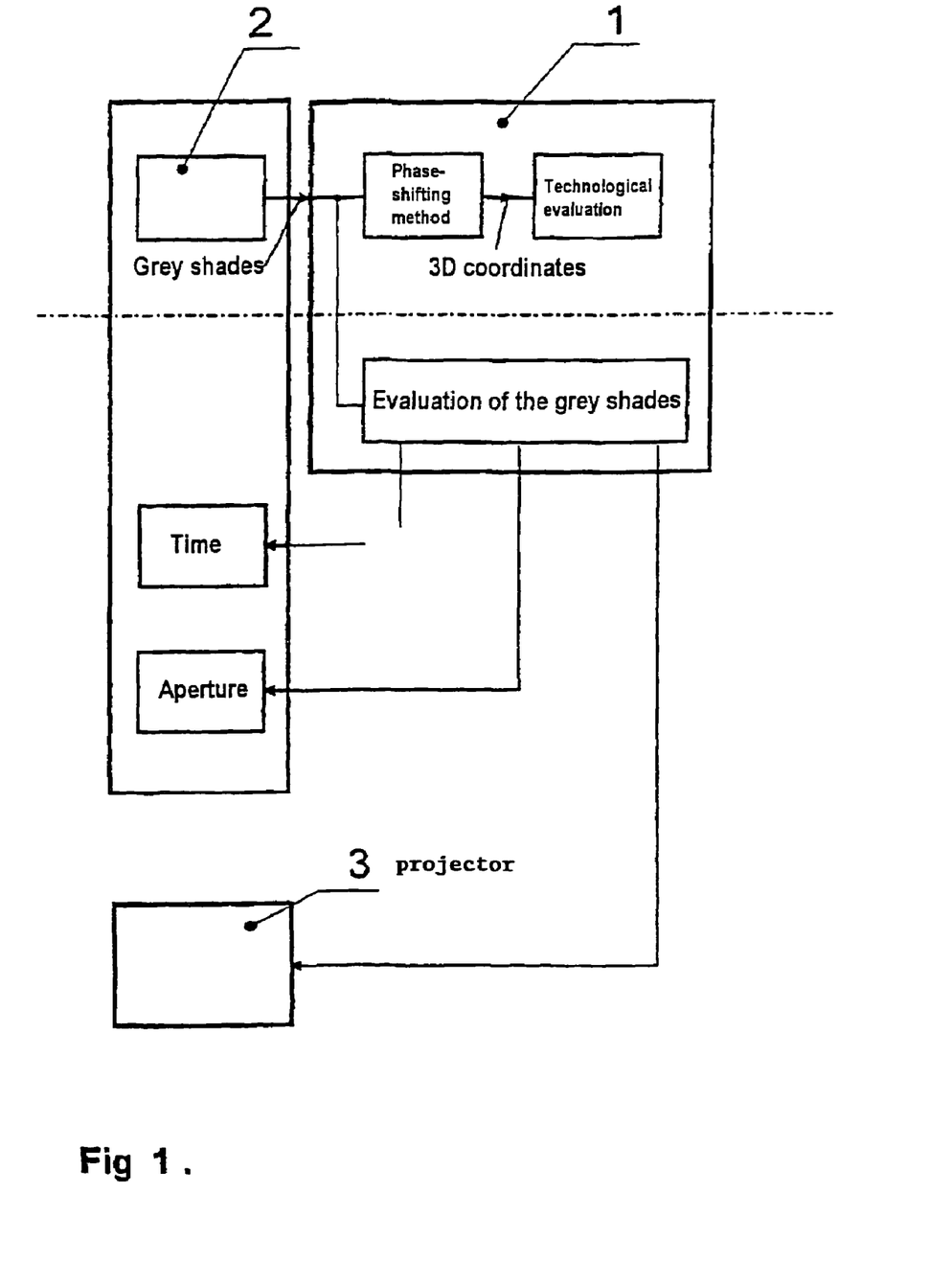
FIG. 1 shows a diagram of the regulated control of the measuring system.

The regulated control of the overall system as shown in FIG. 1 reproduces the conventional construction of a measuring system above the broken line, while the measuring system regulation according to the invention is discernible below the broken line. In this case, in the process computer 1, the grey-shade values generated by the CCD camera 2 are evaluated quantitatively and related to the sensitivity range prescribed by the CCD camera 2. In order to effect measurement in the optimal sensitivity range, the parameters time, aperture and illuminance of the projector 3 are then regulated.

Figure 2:
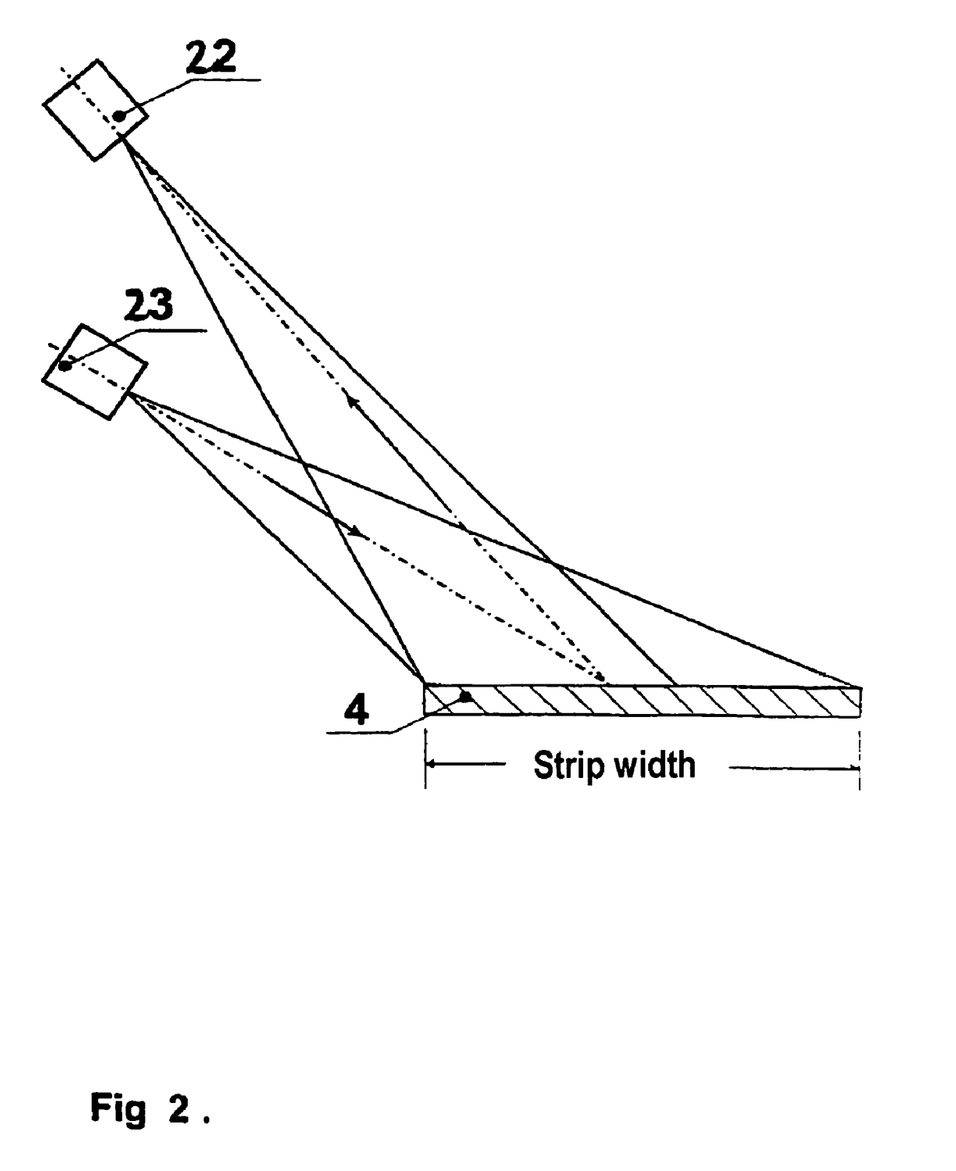
FIG. 2 shows an illustration of an arrangement of projector and camera.

FIG. 2 reveals the arrangement of projector 23 and camera 22, which takes up a significantly smaller space above the strip 4 than conventional systems. In this case, camera 22 and projector 23 can be arranged above one another above the strip or above one another next to the strip. Likewise, camera 22 and projector 23 can be arranged next to one another on one side of the strip or above the strip 4.

The evaluation of the grey shades with regard to the strip geometry is effected according to the customary phase-shifting method with additional filtering of the undesirable measured-value components.

The latter may result from strip movements in the direction of the strip thickness. This direction is the direction of the normal vector to the reference plane. On account of oscillation and bending, then, these strip movements may differ at the individual strip locations. This would result in an error in the measured surface evenness. These undesirable measured-value components are filtered out from the primary measured components. It is assumed here that these undesirable measured-value components differ in frequency and wavelength from the measured-value components which are attributable to the surface evenness to be measured.

Figure 3A:
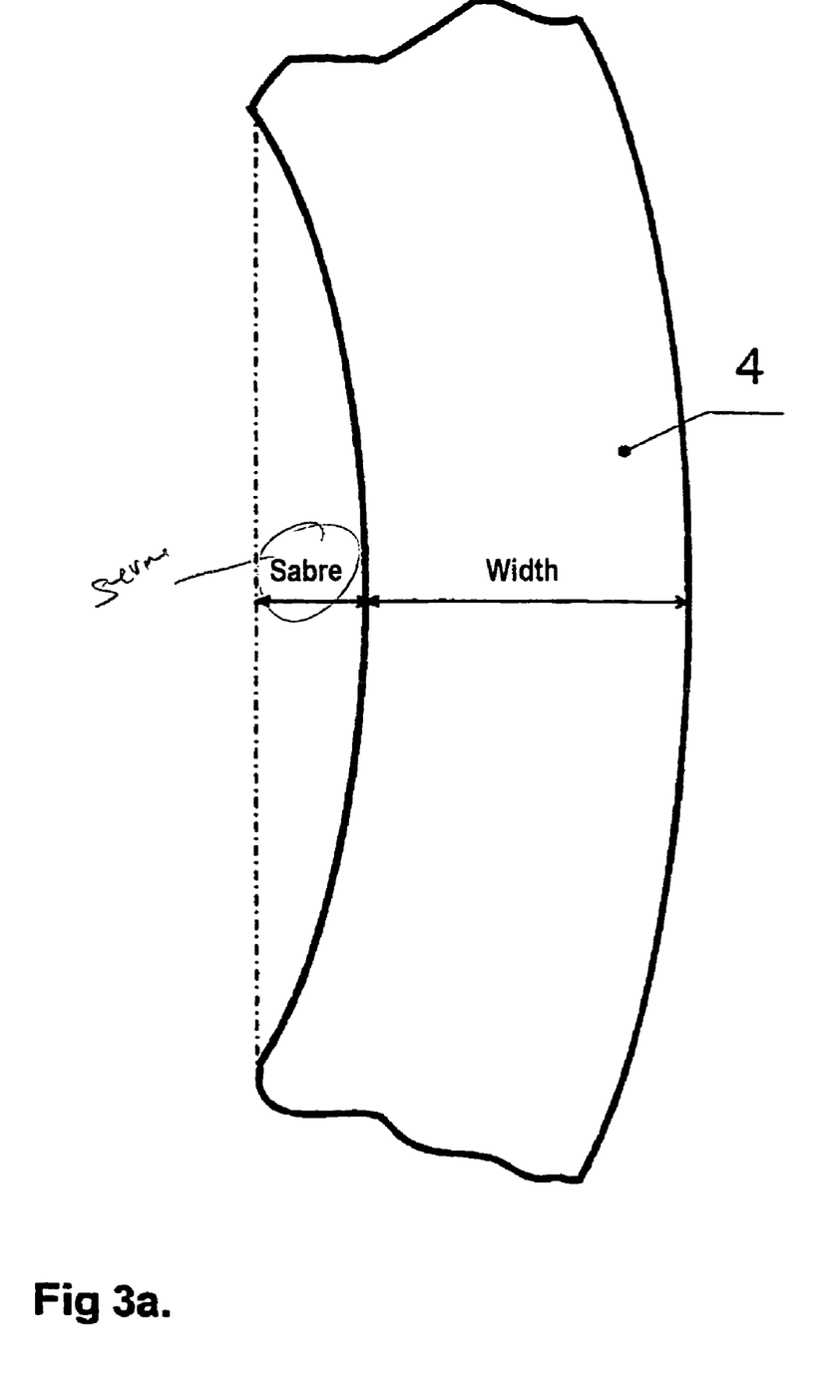
FIG. 3 shows strip form faults such as sabre, ski, curved strip ends and the strip edges for determining the strip width.

FIG. 3 a illustrates the strip form fault "sabre" of the strip 4.

Figure 3B:
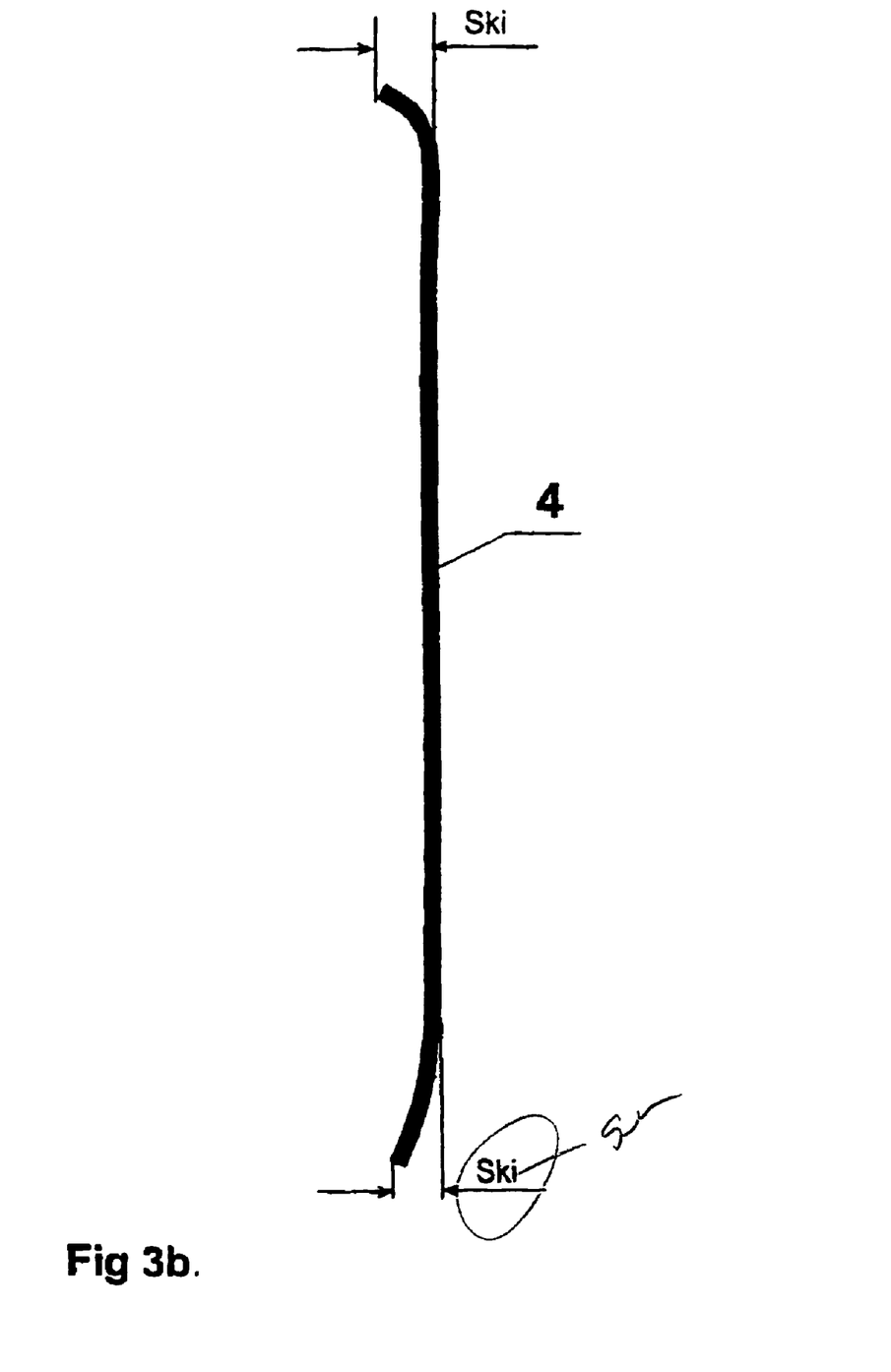

FIG. 3 b illustrates a further strip form fault "ski" of the strip 4. This strip form fault is detected, on the one hand. On the other hand, however, this deformed strip section is excluded from the strip length over which the surface evenness is measured.

Figure 4:
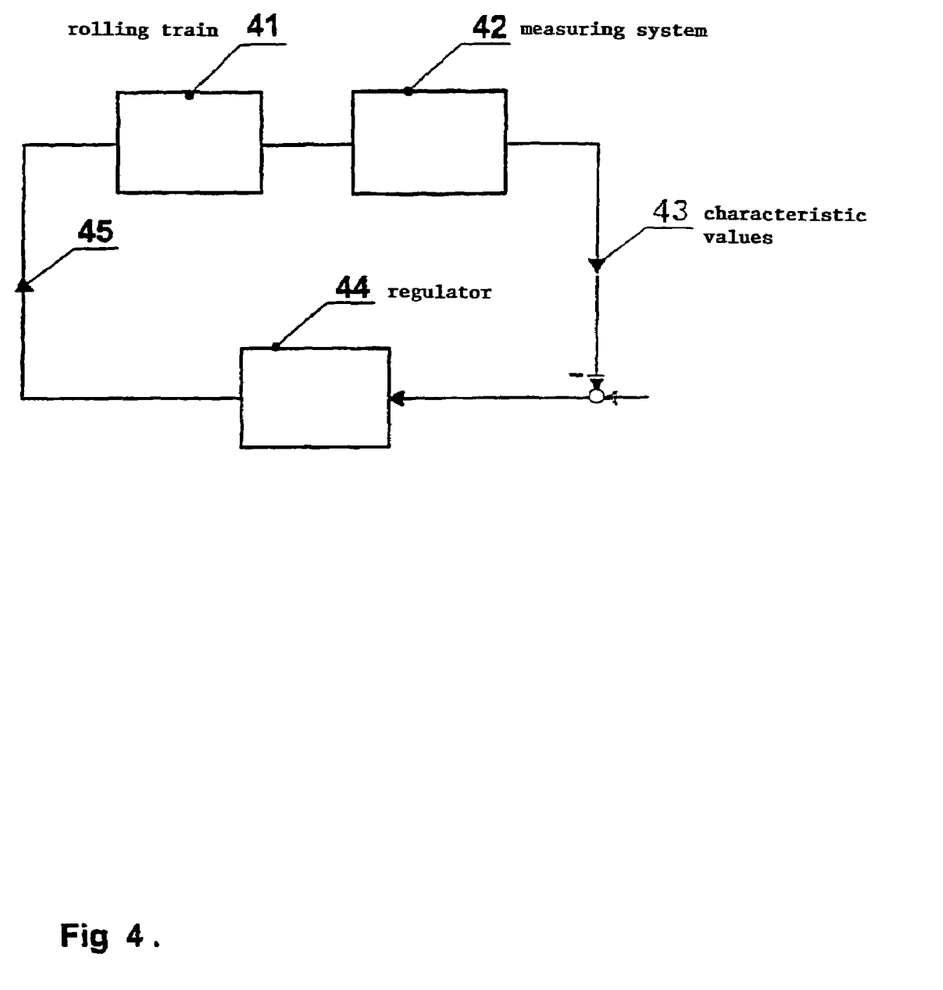
FIG. 4 shows a flow diagram for the sequence of a measurement operation.

The flow diagram illustrated in FIG. 4 reveals the sequence of a measurement operation in which, with the aid of the CCD camera, the strip edges are determined and evaluated by the computer in order finally to be used for the regulation of the rolling train.

The rolling train 41 produces a strip form whose characteristic values 43, such as surface evenness, sabre, ski and strip width, are detected by the measuring system 42. These are fed to a multi-variable regulator 44, which prescribes desired value changes of different manipulated variables on the rolling train.

Figure 5:
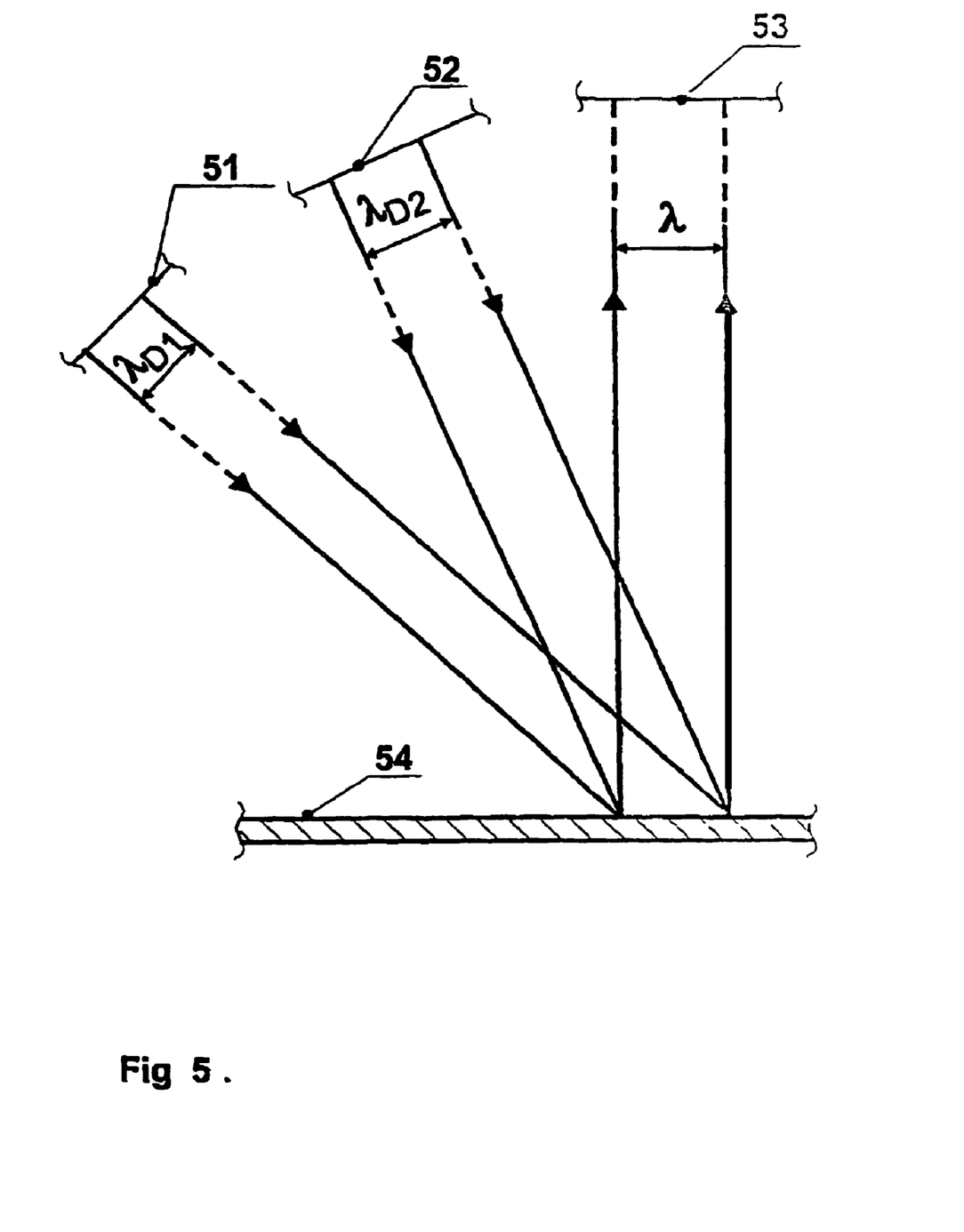
FIG. 5 shows a liquid-crystal element.

FIG. 5 schematically shows the function of a liquid-crystal transparency 51, 52 in conjunction with the measuring system. 51 shows a detail of the transparency 51, 52 over a wavelength D1. Two mounting locations of the projector are shown, which correspond to the liquid-crystal transparencies 51, 52, and a light beam at the start and at the end of a wavelength is illustrated in each case. The camera 53 is shown perpendicular to the strip 54, the camera angle being arbitrary. The aim is to obtain a constant wavelength lambda in the image, irrespective of the position of the projector and camera 53. This aim is achieved by suitably changing the wavelength in the transparency 51, 52 by a program. Consequently, the optimal transparency is in each case set for the prescribed projector and camera angle.

The invention claimed is:

1. Method for measuring the geometry and surface evenness of one side of a first moving metal strip and for measuring the geometry and surface evenness of one side of a second moving metal strip comprising:

providing a moving first metal strip having a surface to be measured;

providing a light source and a transparency between said light source and said surface of said first metal strip;

producing a pattern on the surface of the first metal strip to be measured using said light source, wherein said light source produces a first pattern on the surface of the first metal strip with the aid of said transparency, viewing the pattern on said surface of said first metal strip with a camera;

determining the geometry and surface evenness of said surface of said first metal strip;

providing a moving second metal strip having a surface to be measured;

providing said light source and said transparency between said light source and said surface of said second metal strip;

producing a pattern on the surface of the second metal strip to be measured using said light source, wherein said light source produces a second pattern on the surface of the second metal strip with the aid of said transparency viewing the pattern on said surface of said second metal strip with a camera; and determining the geometry and surface evenness of said second metal strip.

2. Method according to claim 1, comprising producing said first and second pattern with the aid of a liquid-crystal device.

3. Method according to claim 1, comprising filtering elastic form changes using the initially detected peaks and separating the peaks according to different frequencies and wavelength on account of strip movements.

4. Method according to claim 1, comprising determining said geometry by using the edge boundary of the strip.

5. Method according to claim 4, wherein the strip width or cut length is determined from the edge boundary.

6. Method according to claim 1, further comprising measuring the geometry of a known element of a measuring device and generating by computation a reference plane and a reference phase image from said measured geometry.

7. Method according to claim 1, further comprising:

disposing said light source above said moving metal strip and emitting light from said light source;

delivering said light through said transparency onto said metal surface, therein producing said pattern by means of projection; and filtering elastic form changes using the initially detected peaks and separating the peaks according to different frequencies and wavelength on account of strip movements.

8. Method according to claim 1, further comprising:

disposing said light source above said moving metal strip and emitting light from said light source;

delivering said light through said transparency onto said metal surface, therein producing said pattern by means of projection; and determining said strip geometry and surface evenness by using the edge boundary of said strip.

9. Method according to claim 8, characterized in that the strip width or cut length is determined from the edge boundary.

10. Method according to claim 1, further comprising:

disposing said light source above said moving metal strip and emitting light from said light source;

delivering said light through said transparency onto said metal surface, therein producing said pattern by means of projection;

measuring the geometry of a known element of a measuring device and generating by computation a reference plane and a reference phase image from said measured geometry; and comparing said pattern produced on said strip to said reference phase image.

11. Method according to claim 1, characterized in that a line pattern is produced on the metal surface.

* * * * *